(12) United States Patent
Johler

(10) Patent No.: US 7,095,357 B1
(45) Date of Patent: Aug. 22, 2006

(54) METHOD AND APPARATUS FOR TRANSMITTING ELECTROMAGNETIC SIGNALS INTO THE EARTH AT FREQUENCIES BELOW 500 KHZ FROM A CAPACITOR EMPLACED ON THE SURFACE OF THE EARTH OR RAISED ALOFT IN AN AIRCRAFT

(76) Inventor: Joseph Ralph Johler, 16796 W. 74th Pl., Arvada, CO (US) 80007

( * ) Notice: Subject to any disclaimer, the term of this patent is extended or adjusted under 35 U.S.C. 154(b) by 0 days.

(21) Appl. No.: 10/437,024

(22) Filed: May 14, 2003

(51) Int. Cl.
*G01V 3/12* (2006.01)
*G01S 13/88* (2006.01)
*G01S 13/08* (2006.01)
*G01S 13/10* (2006.01)

(52) U.S. Cl. .......................... 342/22; 342/21; 342/82; 342/89; 342/175; 342/176; 342/179; 342/195

(58) Field of Classification Search ............ 342/21, 342/22, 25, 27, 28, 175, 192–197, 25 R–25 F, 342/82–103, 118, 134–145, 176, 179
See application file for complete search history.

(56) References Cited

U.S. PATENT DOCUMENTS

| | | | | | |
|---|---|---|---|---|---|
| 2,517,951 | A | * | 8/1950 | Wheeler | 342/22 |
| 2,575,340 | A | * | 11/1951 | Goldstein | 342/22 |
| 2,581,349 | A | * | 1/1952 | Barret | 342/22 |
| 2,585,907 | A | * | 2/1952 | Barret | 342/22 |
| 2,659,882 | A | * | 11/1953 | Barret | 342/22 |
| 2,660,703 | A | * | 11/1953 | Herbold | 342/22 |
| 2,661,466 | A | * | 12/1953 | Barret | 342/22 |
| 2,766,422 | A | * | 10/1956 | Carbonetto | 342/22 |
| RE24,489 | E | * | 6/1958 | Barret | 342/22 |
| 3,775,765 | A | * | 11/1973 | Di Piazza et al. | 342/22 |
| 3,806,795 | A | * | 4/1974 | Morey | 342/22 |
| 3,831,173 | A | * | 8/1974 | Lerner | 342/22 |
| 3,967,282 | A | * | 6/1976 | Young et al. | 342/22 |
| 4,062,010 | A | * | 12/1977 | Young et al. | 342/21 |

(Continued)

OTHER PUBLICATIONS

J. R. Johler, W. J. Kellar and L. C. Walters "Phase of the Low-Radio Frequency Ground Wave", National Bureau of Standards Circular 573, U.S. Gov. Print Office, Washington, D.C., Jun. 26, 1956.

(Continued)

*Primary Examiner*—Bernarr E. Gregory

(57) ABSTRACT

A method and apparatus comprising four co-planar metallic plates, two for transmission and two for reception, in which each pair of co-planer metallic plates of overall length L are disposed either in direct contact with the earth or are elevated a distance Z above the earth to form a capacitor comprising the metallic plates and the earth if $Z=0$ or if $Z>0$, the metallic plates, the air space and the earth. A short voltage or current pulse is applied to this capacitor via a transformer in which the magnetic flux current is adjusted to provide a pulse of the desired frequency composition in the air-earth propagation medium. This results in a frequency controlled pulse of electromagnetic radiation into the targeted subterranean geology at frequencies <500 KHZ. In the preferred embodiment, the electromagnetic radiation that has propagated through the subsurface is iterated against a theoretical model for earth propagation of vertically traveling up-going and down-going waves to get a solution for the magnitude of the electrical properties as a function of the depth in the medium through which these waves have traveled. Electrical property vs depth profiles of the relative dielectric and the conductivity in addition to wave velocity and attenuation rate at depth in the subsurface are recovered by the iteration. For operation at capacitor altitude Z above the surface of the earth, the overall size of the capacitor, L, can be specified for use in the pulse spectrum below 500 khz.

17 Claims, 3 Drawing Sheets

U.S. PATENT DOCUMENTS

| | | | |
|---|---|---|---|
| 4,677,438 A * | 6/1987 | Michiguchi et al. | 342/22 |
| 4,746,867 A * | 5/1988 | Gunton | 342/22 |
| 5,012,248 A * | 4/1991 | Munro et al. | 342/22 |
| 5,057,844 A * | 10/1991 | Rothstein | 342/22 |
| 5,192,952 A | 3/1993 | Johler | |
| 5,227,799 A * | 7/1993 | Kimura et al. | 342/22 |
| 5,280,284 A | 1/1994 | Johler | |
| 6,573,855 B1 * | 6/2003 | Hayakawa et al. | 342/22 |

OTHER PUBLICATIONS

R. W. P. King and M. Owens 1981, "Antenvasin Matter", The MIT Press, Cambridge, Mass., p. 358.

J. A. Stratton, "Electromagnetic Theory", McGraw-Hill Book Co., N.Y., 1941, p. 435.

J. R. Johler, "Skywave Propagation at Low Frequencies", Wyley Encyclopedia of Electrical and Electromagnetic Engineering, V19, pp. 319-329, John Wyley & Sons Inc. New York, 1999.

* cited by examiner 1 earth capacitor at altitude Z above 2
2 earth surface
3 down going radiation
4 induction and electrostatic fields of 1
5 up going radiation

METHOD AND APPARATUS FOR TRANSMITTING ELECTROMAGNETIC SIGNALS INTO THE EARTH AT FREQUENCIES BELOW 500 KHZ FROM A CAPACITOR EMPLACED ON THE SURFACE OF THE EARTH OR RAISED ALOFT IN AN AIRCRAFT

CROSS-REFERENCE TO RELATED APPLICATIONS

Not Applicable

FEDERALLY SPONSORED RESEARCH

Not Applicable

SEQUENCE LISTING OF PROGRAM

Not Applicable

REFERENCES CITED

U.S. Patent Documents
U.S. Pat. No. 5,192,952 Mar. 9, 1993 Johler
U.S. Pat. No. 5,280,284 Jan. 18, 1994 Johler
Other Publications
J. R. Johler, W. J. Kellar & L. C. Walters "Phase of the low-radio frequency ground wave", National Bureau of Standards Circular 573, U.S. Gov. Print. Off., Washington, D.C. Jun. 26, 1956. R. W. P. King and M. Owens, 1981, "Antennas in Matter", The MIT Press, Cambridge, Mass.
J. A. Stratton, "Electromagnetic Theory", McGraw-Hill Book Co., N.Y., 1941.
J. R. Johler, "Skywave propagation at low frequencies", Wiley Encyclopedia of Electrical and Electronic Engineering, v19, pp319–329, John Wiley & sons, Inc., New York, 1999.

FIELD OF THE INVENTION

This invention pertains to methods and apparatus for transmitting electromagnetic signals into the earth from a capacitor. The invention also pertains to geophysical exploration methods and apparatus in which electromagnetic signals are transmitted into the earth from a capacitor, and return signals that have propagated through the earth are received and processed to produce an electrical property depth profile of the earth. These electrical properties are influenced by mineral and fluid content such as water, oil, natural gas and the frequency of the propagating wave.

Geological formations in the earth at depth are related to the characteristics of a propagating wave in the earth through the electrical properties, to wit, the real effective values of the relative dielectric, the conductivity, and the permeability.

BACKGROUND OF THE INVENTION

Throughout the specification, including the claims, the expressions "earth" and "earth formation" are used in a broad sense to denote any nonhomogeneous, dispersive medium having complex permittivity. Important examples of such media include subterranean formations such as soil, hardpan, and bedrock and bodies of water (such as the ocean) above such subterranean formations.

Two types of pulse transformers are mentioned in this specification: "transmission line" and "conventional". The important parameters that are utilized for frequency control of radiation involve the magnetic cores and the magnetic inductance resulting from conductor turns on the core. In an equivalent electric circuit this gives rise to "magnetic flux currents" as an identifying term for such transformers.

In the prior art pertaining to this invention, U.S. Pat. No. 5,192,952, issued March 1993, and U.S. Pat. No. 5,280,284, issued January 1994 a method and apparatus of sending signals into the earth and a method of processing such signals to describe the electrical properties of the earth as a function of depth in the earth is presented.

At the present juncture in the development of the science demonstrated in these patents it is appropriate to expand the methods and and apparatus for operation aloft in an aircraft. This leads to the use of lower frequencies and a concomittant greater depth of penetration into the earth. Such expansion improves the usefulness and economic value of the capacitor concept.

In this connection, attention is drawn to prior art discussion of the radiation, induction and electrostatic field of an electrical point source discussed by Johler et al in NBS Circular 573 "Phase of the low-radio frequency ground wave". In this document a multiplying factor of the radiation fields was isolated from a solution of Maxwell's Equations for an electrical point source in the form of a dipole and numerical computations were made showing the effects of such radiation fields at various low frequencies. (1000–20 KHz). The multiplying factor, $F_I$, was isolated as multiplied by the radiation field E, which at great distance in wavelengths from the point source reduced to unity giving a pure radiation field, $EF_I$=TOTALP–FIELD. Thus, $$F_r = 1 + \frac{1}{iKz} + \frac{1}{(iKz)^2} \rightarrow 1$$

as the dipole equatorial distance, z gets large in wavelengths, $F_I$ approaches 1. Here K is the wave number of the medium and $i=\sqrt{-1}$. The second and third terms produce effects due to the radiation apparatus, in this case an electrical point source. A complete derivation of the electrical point source is given by J. A. Straton (1941)p435, eqs. 25&26. Of course for the case of a finite size source as shown in FIG. 1,2,3, the factor $F_I$ is much more complicated but this apparatus non-the-less exhibits an analogous behavior.

In the prior art the definition of real effective values of the electrical properties and their relation to physical theory of electromagnetic propagation in such media as the earth has been set forth in standard textbooks such as King et al (1981).

SUMMARY OF THE INVENTION

The present invention is a method and apparatus in which an earth capacitor assembly is disposed either in direct contact with the earth or elevated a distance Z above the earth in an aircraft. A short voltage pulse is applied to the capacitor assembly via a conventional transformer with magnetic flux current adjusted for low frequencies to produce a broad band radiation field of sufficiently high density frequency composition below 500 KHz.

The size, or largest dimension, L of the transmitting capacitor should be sufficiently small to satisfy the relation Re(KL)<1, where K is the wave number in the earth of each frequency processed at the receiver of the radiation transmitted into the earth. For values of Z, the altitude above the earth, the frequencies used in the radiation field must be selected so that KoZ<1., where Ko is the wave number in air.

In the preferred embodiment, the voltage applied to the capacitor plates via the transformer has frequency components in the radiation field at frequencies below 1 Mhz 0.1 MHz and 0.01 MHZ etc. as the spectrum of the radiation field is examined through appropriate lower frequency pass band filters.

DETAILED DESCRIPTION OF THE PREFER EMBODIMENT

This invention introduces an airborne capability on prior art and solves the technical consequences of introducing a layer of air between the capacitor plates and the earth. Thus the capacitor plate assembly can be emplaced on the surface of the earth but can also be elevated a distance Z above the surface of the earth. The consequences of this latter implementation are accommodated in the present invention. Here again, to understand the invention requires some understanding of the the propagation of electromagnetic signals both in the earth and in the air.

Figure 1:
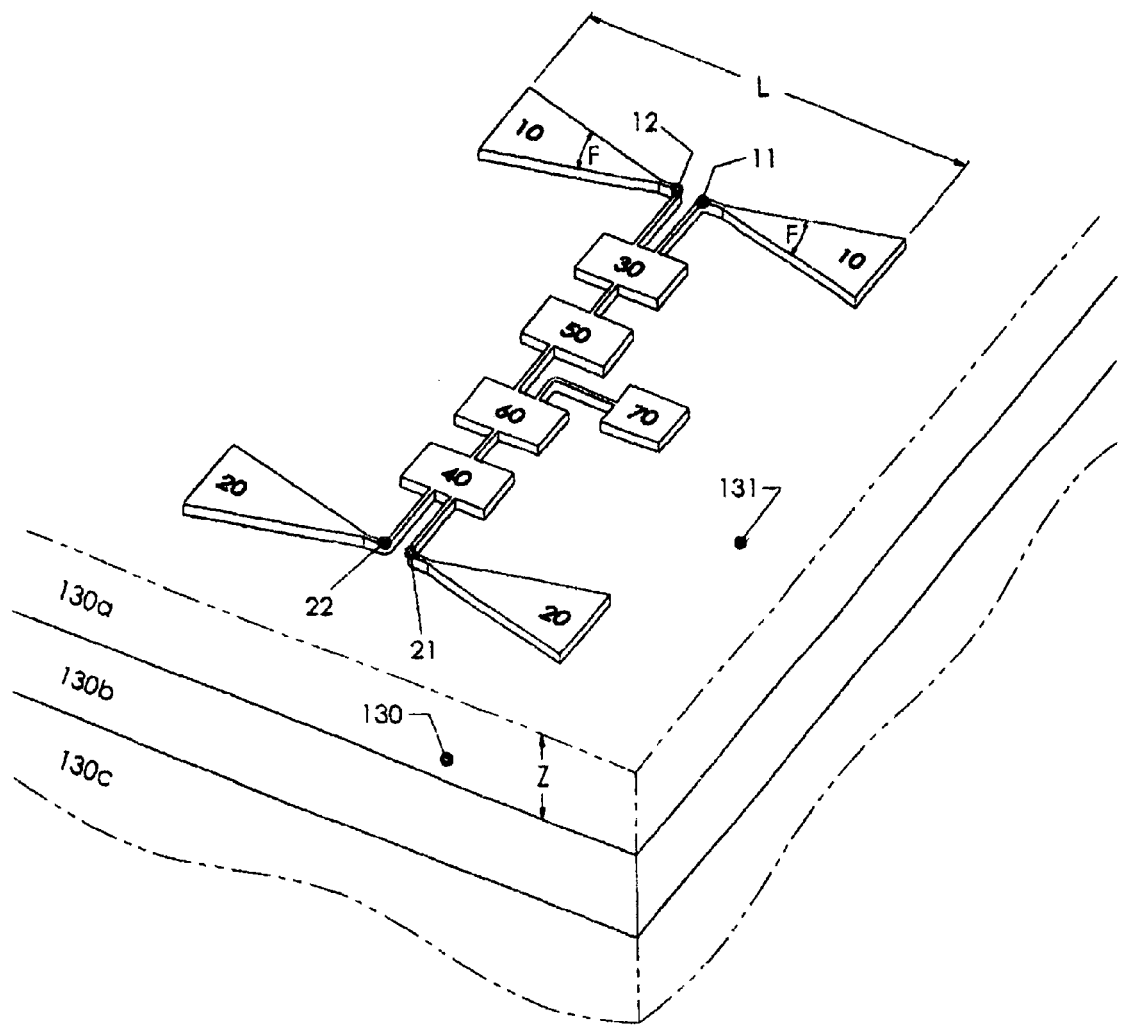
FIG. 1 is a perspective view of a preferred embodiment of the inventive apparatus.

FIG. 1 depicts the preferred embodiment for an earth capacitor elevated a distance Z above the earth. In FIG. 1 transmitting capacitor plates 10 and receiving capacitor plates 20 are disposed in direct contact, Z=0, with the earth's surface or elevated, Z>0, above the earth's surface 130. Each of the plates 10 and 20 is positioned with its flat side parallel to the earth's surface 130, or contained in an imaginary plane, 131, parallel to 130 and positioned a distance Z above the earth formation. Part of plate 10 has a largest dimension L in the plane of the earth's surface, Z=0, or in a plane 131 parallel to the earth's surface at an altitude Z.

Figure 2:
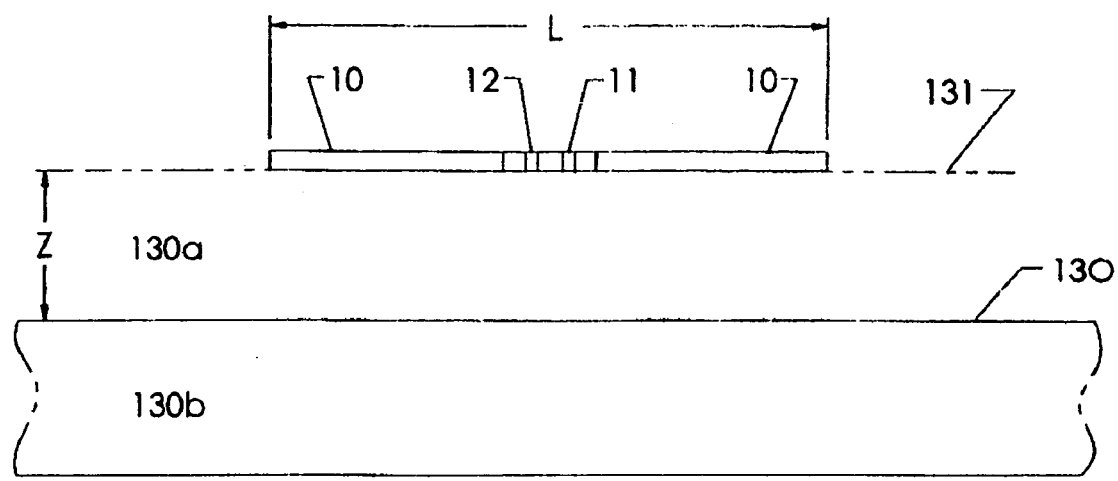
FIG. 2 is a side view of one of the capacitors in FIG. 1

Although plates 10 and 20 are shown to be identical disk sections in FIG. 1 (having identical flare angle F), they need not be identical. In one class of preferred embodiments, plates 10 and 20 are composed of metal such as copper or brass. In another class of embodiments, plates 10 and 20 have a thin layer coating, such as a plastic coating having a thickness in the range of about one to two millimeters. Typical values of L and F are 0.5 meters and 90 degrees, respectively. As shown in FIG. 2 plates 10 are very thin in a direction perpendicular to either plane 130 or 131. Typically plates 10 and 20 are not separated more than 1 foot. Although not critical, this is desirable when plates are elevated in an aircraft.

Input terminal 11 of the transformer 30 is connected to a corner of one of plates 10 and transformer terminal 12 is connected to the adjacent corner of plates 10. Input terminal 21 of the receiving transformer 40 is connected to a corner of one of plates 20, and input terminal 22 is connected to the adjacent facing corner of plate 20. In the present embodiment transformers 30 and 40 are identical, specially designed low frequency conventional transformers.

The apparatus depicted in FIG. 1 operates completely independent of the earth with a battery power source. Thus the only contact with the earth is through the capacitor and its electrostatic, induction and radiation fields. In this particular embodiment of the apparatus simplicity of design is emphasized. The Voltage pulse generator together with its power supply is shown as 50. The return signal digitizer and recorder, including a power supply is 60. 70 is a global positioning system (GPS) receiver which is required to determine Z and the precise geographical location for each set of data.

Pulse generator 50 applies a high voltage pulse of short duration to the capacitor terminals 11 and 12 via the conventional pulse transformer 30. Torroidal core transformers of ferrite or amorphous material with a step down turns ratio of 200 are used for this particular embodiment. Thus the short voltage pulse is converted to a current pulse. Transformer Core permeability of 2000 to 5000 gauss are used in this embodiment.

For all practical purposes earth formation 130a or "air" can be represented by a real number and is typically a relative dielectric constant of 1.0007. At low frequencies 1. is usually a good approximation. On the other hand earth formation 130b has a complex permittivity and/or conductivity, and since radiation is transmitted into formations 130a and 130b via plates 10, the impedance between terminals 11 and 12 has both capacitive and resistive components, provided the frequency under consideration satisfies the inequality, KoZ<1, where Ko is the wave number for air. Table 1, brackets this inequality in terms of frequency in KHz and altitude, Z, in meters.

TABLE 1 of KoZ < 1

| Z,M | FKHz < |
|---|---|
| 1 | 47713 |
| 10 | 4771 |
| 100 | 477 |
| 1000 | 47.7 |
| 10000 | 4.77 |

Where FKHz is the frequency in KHz.

Since formation 130b, in general, has a complex permittivity and/or conductivity, and since radiation is transmitted into formation 130b upon application of a short pulse to plates 10 via transformer 30, the impedance at low frequencies is between terminals 11 and 12 has both resistive and capacitive components. The earth surface 130 via the air is placed in an electrical circuit with the pulse generator 50, the transformer 30 and the plates 10 when Table 1 inequality is satisfied for the frequency under consideration.

Plates 20 receive the up-going set of waves from the depths of the earth for processing. The transformer 40 is usually identical to transformer 30 but may contain an analog filter before entering the digitizer and signal processor 60. At this stage of the operation the low frequencies to be used are selected in accordance with the conditions prescribed by the methodology used with this apparatus. Additional information for the data processing may be entered by GPS equipment 70.

Figure 3:
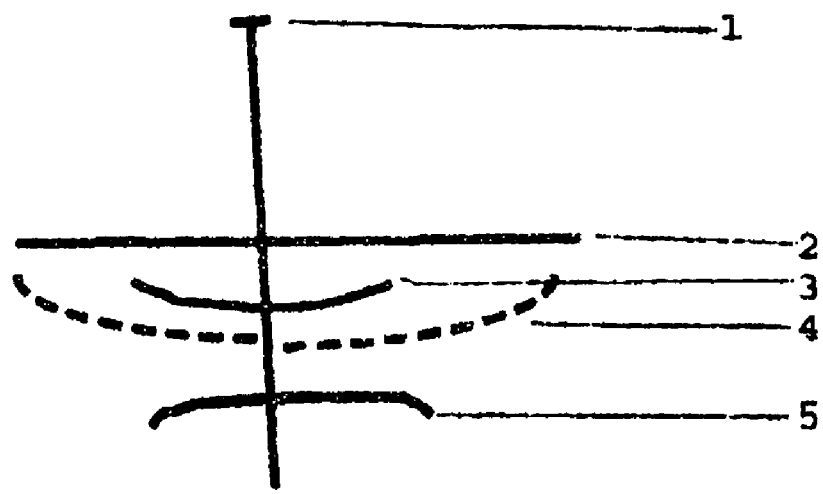
FIG. 3 is a diagrammatic representation of the electromagnetic waves of interest.

FIG. 3 depicts the electromagnetic waves of interest to the apparatus description in FIG. 1 and FIG. 2. The earth capacitor, 1 with overall dimension, L, at a distance Z>or =0 above the earth surface, 2, gives rise to down-going radiation, 3, in the earth formation together with up-going waves 5 provided the induction and electrostatic fields (see prior art) of the apparatus, satisfy the inequalities, KoZ<1, and Re(KZ)<1. This means that the apparatus is coupled to the earth formation and can give rise to strong radiation fields in the earth formation.

As the frequencies employed by this apparatus become lower and extremely low frequencies are generated the effects of coupling into the ionosphere may become possible. For purposes of analyzing the electrical properties of the earth formations the complex effects of the ionosphere must be filtered if indeed there is coupling into this medium. The nature of ionospheric waves at low frequencies is discussed by Johler, "skywave propagation at low frequencies", 1999. If H is the height of the lowest ionosphere, during daytime noon it may be approximately 60000 meters. The relation, Ko(H-Z)<1 is required for this consideration:

Table 2 Of Ko(H-Z) < 1

| (H-Z),M | FHz <, |
|---|---|
| 60000 | 795 |
| 50000 | 954 | where FHz is the frequency in Hertz.

Thus with Z=0 at daytime noon a filter may be required for frequencies less than 795 Hz. If Z=10000 meters, frequencies less than 954 Hz may require filtering. Of course at night the ionosphere's lower boundary, H, is much higher such that such a filter may not be required.

The methodology employed with the apparatus is as important as the apparatus itself. A pulse generator with enhanced inductive transformer coils exciting the earth capacitor terminals generates a multitude of frequencies which are selectively filtered at the receiving capacitor terminals and in the signal processing described in U.S. Pat. No. 5,280,284 (1994). Thus frequency is the most important parameter in the operation of the apparatus. The presently described apparatus is directed toward greater depth of penetration into the earth and the convenience of surveying in an aircraft above the surface of the earth. Both of these requirements call for lower frequencies below 500 KHZ, and especially below 25 KHZ.

The methodology as described in the above mentioned prior art and in this patent does not attempt to image the ground with the pulses as is done in conventional RADAR. Instead, the pulse is used to model the propagation with a system of up-going and down-going waves using Maxwell's equations to determine the electrical properties, i.e. the relative dielectric, conductivity and possibility the permeability, as a function of depth, by an iterative process. The solution for depth is therefore unique. It is necessary to interpret the electrical property data set to identify the substance found. This is an art under development.

The specification limits on the processung of frequency is conveniently accomplished with the use of wave number, K, cycles per meter. Thus, in air K=Ko and:

$$Ko = 2\pi f \eta / c$$

where, f=frequency, Hertz $\eta = \sqrt{\epsilon}$, index of refraction of air, approximately =1.

$\epsilon$=the relative dielectric.

c=0.299792458 meters per nanosecond.

In the earth, K is complex, and using $\mu = \mu_o = 4\pi(10)^{-7}$, henry per meter, $$K = \frac{\omega}{c} \sqrt{\left(\epsilon - i\frac{\sigma \mu_0 c^2}{\omega}\right)}$$

$$\omega = 2\pi f.$$

Hence, the real part of K or Re (K) is used in the earth. Both K and Ko have dimensions of cycles per meter or wavelengths per meter. This leads to the notion of Re(KL)<1 wherein the conducting plates are small relative to a wavelength and hence present a negative or capacitive reactance. In both transmitting and receiving parts of the apparatus, capacitive impedance exists at the terminals where the inductive transformers are located.

KoZ and Ko(H-Z) are used to describe the closeness to the earth or the Ionosphere and these induction and electrostatic fields cause strong coupling to the earth when KoZ<1 or couple to the ionosphere when Ko(H-Z)<1. This is not to be confused with the synchronous arrival time of the ionospheric pulse at vertical incidence. With H=0 or on the surface of the earth, for vertically traveling up-going and down-going waves, the first reflection from the ionosphere can arrive no sooner than 400277 nanoseconds if the ionosphere reflection point is assumed to be 60000 meters This leads to a portion of the returning synchronous pulse that is pure ground or earth wave, uncontaminated by the highly variable ionosphere. This allows the depths of the earth to be examined for electrical propertied to depths of 20000 feet or more. This phenomenon of a pure ground or earth wave, uncontaminated by skywaves is discussed in detail by Johler (1999).

The use of a pulse to penetrate the earth to great depths requires the removal of high frequencies that are unavoidably generated by the pulse generator. Thus such frequencies only penetrate the earth a short distance. These high frequencies must be removed through analog and digital filters and the pulse must then be reconstituted as a low frequency pulse before the iteration process can be used to explore the depths of the earth. For this reason the specification of this patent required the wave number to rigorously identify frequencies that can be used in the processing of the returning pulse signal.

I claim:

1. A method for transmitting an electromagnetic signal or pulse to and through an earth formation and recovering from the return signal or pulse, select frequencies that are strongly coupled to the earth at aircraft heights or on the surface of the earth and at the same time penetrate to great depths of the order of tens of thousands of feet or more including the steps of:

(a) disposing capacitor plates having a largest dimension L either in direct contact with the earth formation or elevated a height Z above the earth formation to form an earth capacitor comprising the plate assembly, the air or space between the plates and the earth if Z>0 and the region in the earth formation either in direct contact with the plates or separated from the plates by the height, Z>0, whereupon returning frequencies are selected that in the earth formation are electrically coupled or for each frequency up to the highest selected frequency, where KoZ<1 and Ko is the wave number in air, (b) applying a short voltage or current pulse via a transformer with core magnetic flux adjusted for enhanced radiation at lower frequencies <500 KHZ, across the capacitor plates from a pulse generator to transmit electromagnetic radiation into the earth formation, where for each returning lower frequency component of the electromagnetic radiation, the largest dimension L is small such that Re(KL)<1 and KoZ<1, where Re(K) is the positive wave number in the earth formation of said lower frequency component and Ko is the positive wave number in air of each returning lower frequency component at all frequencies present <1 MHZ and indeed very much less than 1 MHZ, (c) detecting electromagnetic radiation that has propagated through the earth formation in response to application of the short voltage or current pulse, and (d) processing only frequency components of the desired electromagnetic radiation, in a select lower frequency window, in the broad frequency continuum <1 MHZ which lower frequencies have propagated into the earth formation to penetration depth very much greater than of the order of several tens of thousands of feet to detect the electrical properties, that is, the reconstituted pulse amplitude as a function of time is transformed into the magnitude of the relative dielectric and the conductivity as a function of depth using a model for a system of vertically traveling up-going and down-going waves and Maxwell's Equations to deduce said electrical properties with an iterative process.

2. The method of claim 1, also including the step of controlling the intensity of the short voltage or current pulse during step(b), such that the transformer-earth capacitor complex is excited to produce sufficiently lower frequency electromagnetic radiation capable of penetrating to the desired penetration depth so that the electrical properties of such a penetration depth can be detected, that is, the relative dielectric and the conductivity magnitudes are determined as a function of depth by the iterative process.

3. The method of claim 1, wherein frequency components of the electromagnetic radiation from the depths <0.5 MHZ are selected for processing to determine the electrical properties at depth for step(d), that is, the reconstituted pulse amplitude as a function of time is transformed into the magnitude of the relative dielectric and the conductivity as function of depth and indeed frequency using a model for a system of vertically traveling up-going and down-going waves and Maxwell's equations to deduce said electrical properties with an iterative process.

4. The method of claim 1, wherein each of the plates is in direct contact with the earth formation Z=0 or is elevated above the earth formation, Z>0, in a plane parallel to the surface of the earth, or if the earth is irregular perpendicular to the prime vertical.

5. The method of claim 1 wherein the detection of the electrical properties, that is, the determination of the magnitude of the relative dielectric and the conductivity over a finite spectrum is used as a means for qualitative identification of the fluid and mineral content of the formation as a function of frequency and depth in the earth.

6. An apparatus for transmitting an electromagnetic signal or pulse through an earth formation and recovering the returning signal or pulse for processing to determine electrical properties at depth including, a capacitor assembly comprising a co-planar pair of highly conductive metallic plates with electrical input or output terminals between the plates wherein each pair of terminals connect to an input or output transformer with magnetic flux cores and wherein each pair of plates has a largest dimension L disposed either in direct contact with the earth formation to form an earth capacitor comprising the capacitor assembly and the region of the earth formation near said capacitor assembly; or elevated above the earth formation to form a capacitor comprising the capacitor assembly, and the earth formation separated from the capacitor assembly by the air of thickness Z, a means for applying a short voltage or current pulse to the capacitor assembly via the transformer with magnetic flux core adjusted for radiation <0.5 MHZ, to transmit electromagnetic radiation into the earth formation either directly or via the air of thickness Z, wherein for each frequency component of the electromagnetic radiation, the largest dimension L satisfies the relation Re(KL)<1, where K is the wave number in the earth formation of said frequency component, wherein the short voltage or current pulse as applied to earth capacitor plates via and in convolution with the transformer with magnetic flux core has frequency components in the broadband <1 MHZ and, a means for detecting electromagnetic radiation that has propagated through the earth formation in response to application of the short voltage or current pulse, including means for processing only frequency components of the detected electromagnetic radiation having an upper frequency less than 1 MHZ and a lower frequency very much less than 1 MHZ depending upon the depth of interest for wave penetration.

7. The apparatus of claim 6, wherein the means for detecting electromagnetic radiation includes a receiving capacitor disposed adjacent the earth formation or elevated a distance Z above the earth formation at a location separated a space restrictive distance, S, from the transmitter assembly, where S<3L, but arranged with the plates parallel and co-planer to the transmitting plates.

8. The apparatus of claim 6, also including the means for processing the detected electromagnetic radiation to identify the earth formation by its electrical properties, that is, the means to transform the reconstituted pulse amplitude as a function of time into the magnitude of the relative dielectric, and the conductivity as a function of depth in the earth using a model for a system of vertically traveling up-going and down-going waves and Maxwell's equations to deduce said electrical properties with an iterative process.

9. The apparatus of claim 6, wherein the capacitor assembly includes a pair of conductive plates in direct contact with the earth formation, or elevated the height Z above the earth formation, and wherein the means for applying the short voltage or current pulse across the plates via a transformer with magnetic flux core adjusted for radiation <0.5 MHZ.

10. The apparatus of claim 6, wherein the means for identifying the electrical properties of the earth formation include means for processing all frequencies <0.5 MHZ.

11. The apparatus of claim 6 where the means for applying a short voltage or current pulse to the capacitor assembly include:

a pulse generator a transmission line or a conventional transformer, with magnetic flux core adjusted for radiation <0.5 MHZ to form the connection between the pulse generator and the capacitor assembly.

12. The apparatus of claim 6 wherein the means for applying a short voltage or current pulse to the capacitor assembly includes:

a pulse generator a transmission line or conventional transformer both with magnetic flux core between the pulse generator and the capacitor assembly, wherein the pulse generator includes a means for simultaneously asserting two opposite polarity voltage or current pulses to the capacitor plates via the transformer.

13. A method for transmitting electromagnetic signals through the earth formation, including the steps of:
  (a) disposing capacitor plates having a largest dimension L in direct contact with the earth formation or elevated a distance Z above the earth formation forming an earth capacitor comprising the plates and a region of the earth formation near the plates or the region of air between the plates and the earth formation whereupon the frequencies employed make the air thickness electrically small so that the plates are electrically close to the earth formation,
  (b) applying a short voltage or current pulse to transmit electromagnetic radiation into the earth formation, wherein for each frequency component of the electromagnetic radiation, the largest dimension L satisfies the relation $Re(KL)<1$, where K is the wave number in the earth formation of said frequency component, wherein the short voltage or current pulse applied through the transformer has radiation field components in a broad band below 1 MHZ with the additional requirement that $KoZ<1$ thus enforcing the further desirable restriction of using much lower frequencies below 500 KHZ,
  (c) detecting electromagnetic radiation that has propagated through the earth formation in response to application of the short voltage or current pulse: and
  (d) processing only frequency components of the detected electromagnetic radiation in a frequency window having an upper frequency less than 0.5 MHZ which have propagated into the formation to a penetration depth very much greater than the largest dimension L.

14. The method of claim 13, wherein step (d) includes the operation of identifying frequency components of the detected electromagnetic radiation which have propagated into the earth formation to a penetration depth much greater than of the order of several thousand feet.

15. An apparatus for transmitting an electromagnetic signal through the earth formation to very great depths relative to a restrictive size, R, of the capacitor plates, including:
  a capacitor assembly having a largest dimension $L<R$ disposed in direct contact with the earth formation or elevated above the earth formation a distance Z to form an earth capacitor comprising the capacitor assembly, the space between the capacitor assembly and the earth formation if $Z>0$, and a region of the earth formation coupled to the capacitor assembly or if $Z=0$, comprising the capacitor assembly and the adjacent earth formation, also including
  a means for applying a short voltage or current pulse to capacitor assembly to transmit electromagnetic radiation into the earth formation, wherein for each frequency component of the electromagnetic radiation, the largest dimension L satisfies the relation $Re(KL)<1$, where K is the wave number in the earth of said frequency component, provided if $Z>0$, $KoZ<1$ and a means for detecting electromagnetic radiation that has propagated through the earth formation and the space $Z>0$, in response to the application of a short voltage or current pulse, including means for identifying frequency components of the detected electromagnetic radiation in a frequency window which have propagated into the earth formation to a penetration depth much greater than several tens of thousand feet, wherein the means for applying the short voltage or current pulse to the capacitor assembly includes:
  a pulse generator
  a transmission line transformer or a conventional transformer both with core magnetic flux current adjusted for frequencies <0.5 MHZ, between the pulse generator and the capacitor assembly.

16. The apparatus of claim 15, wherein the transmission line or conventional transformer has core magnetic flux adjusted for radiation <0.5 MHZ to accommodate the restriction R.

17. The apparatus of claim 15, wherein transmission line or conventional transformers are used to obtain radiation field waves sufficiently low in frequency to penetrate to great depths
  by adjusting the core magnetic flux, the transformer core permeability and the net inductance applied to the capacitor plates.

* * * * *